(12) United States Patent
Reiter et al.

(10) Patent No.: US 9,024,811 B2
(45) Date of Patent: May 5, 2015

(54) FULL FIDELITY RADAR RECEIVER DIGITAL VIDEO DISTRIBUTION AND PROCESSING

(75) Inventors: Carsten Reiter, Preetz (DE); Steffen Kröger, Kiel (DE); Meinhard Wohlgemuth, Kiel (DE); Thomas Edward Wood, Portsmouth, RI (US)

(73) Assignees: Raytheon Anschutz GmbH, Kiel (DE); Raytheon Company, Waltham, MA (US)

( * ) Notice: Subject to any disclaimer, the term of this patent is extended or adjusted under 35 U.S.C. 154(b) by 699 days.

(21) Appl. No.: 13/319,996

(22) PCT Filed: May 12, 2009

(86) PCT No.: PCT/EP2009/055730
§ 371 (c)(1),
(2), (4) Date: May 21, 2012

(87) PCT Pub. No.: WO2010/130287
PCT Pub. Date: Nov. 18, 2010

(65) Prior Publication Data
US 2012/0218138 A1   Aug. 30, 2012

(51) Int. Cl.
*G01S 13/00* (2006.01)
*G01S 7/00* (2006.01)
*G01S 7/298* (2006.01)

(52) U.S. Cl.
CPC .................. *G01S 7/003* (2013.01); *G01S 7/298* (2013.01); *G01S 13/003* (2013.01)

(58) Field of Classification Search
CPC ............................... G01S 7/003; G01S 213/89
USPC ..................................... 342/146, 147, 159, 91
See application file for complete search history.

(56) References Cited

U.S. PATENT DOCUMENTS

| | | | |
|---|---|---|---|
| 5,923,285 A | 7/1999 | Andrusiak et al. | |
| 6,633,253 B2* | 10/2003 | Cataldo | 342/25 R |
| 6,738,011 B1* | 5/2004 | Evans | 342/26 C |
| 2003/0210183 A1 | 11/2003 | Andrusiak et al. | |

OTHER PUBLICATIONS

Folsom Research USA: "RDA-2000 Single-slot PCI Radar Data Acquisition Board", Mar. 6, 2005, XP002571110, Retrieved from the Internet: URL:http://radar.folsom.com/pdf/RDA2000 datasheetpdf>. [retrieved on Mar. 2, 2010](website no longer exists, unable to obtain this article).

(Continued)

*Primary Examiner* — Timothy A Brainard
(74) *Attorney, Agent, or Firm* — Daly, Crowley, Mofford & Durkee, LLP

(57) ABSTRACT

A processing device for providing radar data onto a local area network includes an analog-to-digital converter operable to receive analog radar data from an antenna and converter operable to convert the analog radar data into digital radar data. An interference rejector removes radar signals of other antennas from the digital radar data. A range bin decimator limits the digital radar data to a threshold number of range bins. A trigger-to-azimuth converter associates the digital radar data to particular azimuths of rotation of the antenna. A local area network manager places the digital radar data onto a local area network. The processing device may be located in the pedestal with the antenna. A plurality of processing devices associated with a plurality of antennas may provide digital radar data onto the local area network. A plurality of computers may be connected to the local area network and each computer can process the digital radar data from one or more processing devices to present a radar image on a display.

15 Claims, 4 Drawing Sheets

(56) References Cited

OTHER PUBLICATIONS

Notification Concerning Transmittal of International Preliminary Report on Patentability (Chapter 1 of the Patent Cooperation Treaty), PCT/EP2009/055730, date of mailing Nov. 24, 2011, 12 pages.

PCT International Search Report, PCT/EP2009/055730, date of mailing Jun. 14, 2010, 5 pages.

* cited by examiner

FULL FIDELITY RADAR RECEIVER DIGITAL VIDEO DISTRIBUTION AND PROCESSING

TECHNICAL FIELD OF THE DISCLOSURE

This disclosure generally relates to radar systems and radar signal processing and more particularly to a system and method for full fidelity radar receiver digital video distribution and processing.

BACKGROUND OF THE DISCLOSURE

Radar is a system that uses electromagnetic waves to identify the range, altitude, direction, or speed of both moving and fixed objects, such as aircraft, ships, and terrain. A radar system has a transmitter that emits either microwave or radio wave signals that are reflected by the target and detected by a receiver. Radar signals may be distributed to a variety of radar displays. Radar signal distribution has been implemented with a central analog radar switchboard that accepts analog signals from multiple radars and provides outputs to a number of dedicated radar display consoles. In a maritime context, the analog signals are transported from the radar receiver to the base of a ship for digitization. Such an arrangement requires the use of several analog cables throughout the ship and the use of specialized electronics within each display console to digitize the information.

SUMMARY OF THE DISCLOSURE

From the foregoing, it may be appreciated that a radar distribution system may be desired that allows for the distribution of full fidelity digital radar video to multiple display consoles, obviating the need for specialized electronics within each display console while preserving the benefits of accessing unprocessed, full fidelity radar video.

In accordance with embodiments of the disclosure, a processing device for providing radar data onto a local area network includes an analog-to-digital converter operable to receive analog radar data from an antenna and converter operable to convert the analog radar data into digital radar data. An interference rejector removes radar signals of other antennas from the digital radar data. A range bin decimator limits the digital radar data to a threshold number of range bins. A trigger-to-azimuth converter associates the digital radar data to particular azimuths of rotation of the antenna. A local area network manager places the digital radar data onto a local area network. The processing device may be located in the pedestal with the antenna. A plurality of processing devices associated with a plurality of antennas may provide digital radar data onto the local area network. A plurality of computers may be connected to the local area network and each computer can process the digital radar data from one or more processing devices to present a radar image on a display.

A potential technical advantage of some embodiments of the invention is the ability to minimize the cost of installing multiple navigation radars and displays aboard a ship. Another potential technical advantage of some embodiments of the invention is the ability to provide full fidelity digital video to each radar display console to allow each display console full capability for sensing and tuning the radar signal. Other advantages may be readily ascertainable by those skilled in the art from the following description, figures, and claims.

BRIEF DESCRIPTION OF THE DRAWINGS

A more complete understanding of embodiments of the disclosure will be apparent from the detailed description taken in conjunction with the accompanying drawings wherein like reference numerals represent like parts, in which.

DETAILED DESCRIPTION OF EXAMPLE EMBODIMENTS

Figure 1:
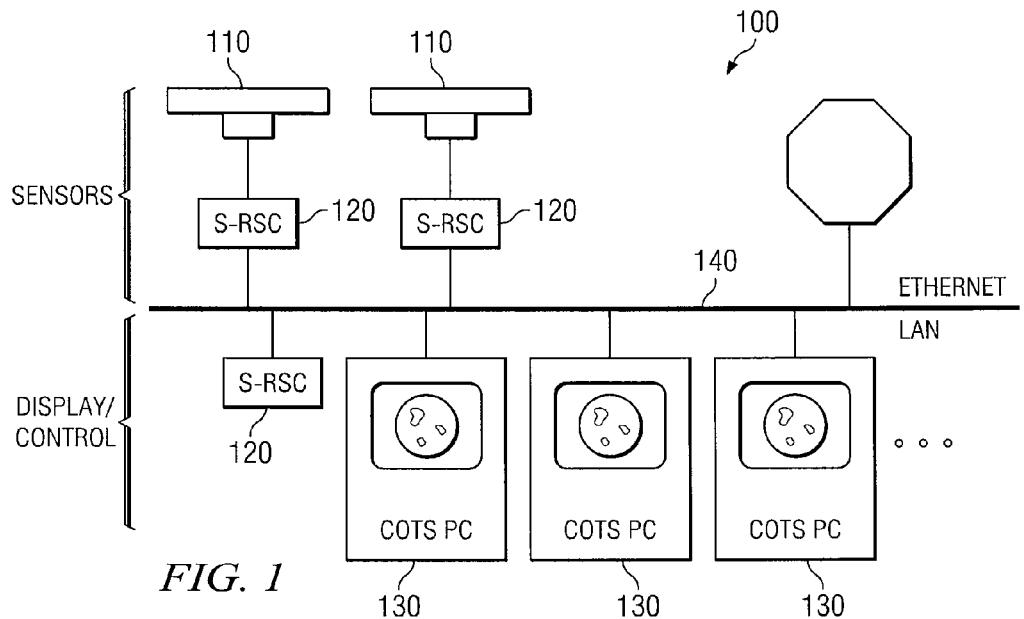
FIG. 1 illustrates a diagram showing the environment within which one embodiment of a radar system for full fidelity radar receiver digital video distribution and processing.

FIG. 1 shows the environment within which one embodiment of a radar system for full fidelity radar receiver digital video distribution and processing may operate. Generally, radar system 100 includes antennas 110 that propagate electromagnetic signals that are later received by transceivers. Each transceiver passes the received analog signals to a radar scan converter 120, which digitizes and processes the signals for distribution to multiple Commercial Off-The-Shelf (COTS) computers and monitors 130 over a digital network 140. The radar scan converter performs minimal pre-processing such that each COTS computer and monitor receives full fidelity digital radar video.

Antennas 110 send out pulses of microwave or radio wave signals that are reflected by an object and detected by a transceiver. The distance from the object to the transceiver is related to the time it takes for the reflected waves to return to the transceiver. Antennas may be designed to emit signals at a variety of timing intervals, with the pattern of pulses known as pulse repetition frequency (PRF). In order to maximize the ability to detect objects at a far distance from the transceiver, one may want to use longer intervals between pulses. Similarly, one may desire for short range radars to operate with smaller intervals between pulses.

Antennas 110 may be used as part of a radar, phased array, or similar apparatus. Under International Maritime Organization (IMO) standards, an antenna scans the 360 degree rotation at a rate no less than 12 revolutions per minute (RPM). To qualify as an Automatic Radar Plotting Aid (ARPA), the rotation rate must be at least 20 RPM. To be qualified for High Speed Craft (HSC), the rotation must be at least 40 RPM. Many military surface search radar antennas use scan rates up to 60 RPM. Thus, different scan rates will need to be taken into account.

Radar system 100 may support a set of range scales in a geometric series that doubles (or halves) with each increment (decrement). Typical range scales are 1.5, 3, 6, 12, 24, and 48 nautical miles, with the set of range scales extensible on both ends. On a display, the physical size of the radar image (PPI) stays fixed with the distance represented by each pixel changing with the range scale.

The radar scan converter 120 allows for the signal processing to be migrated to the COTS computers and displays 130 by providing radar signals received by an antenna onto the digital network 140. Radar scan converter 120 provides high bandwidth information or imagery over a broadcast network for simultaneous use by a large number of COTS computers and displays 130.

The video signals are transmitted from each radar scan converter 120 to the COTS computers and displays 130 over the digital network 140. Digital network 140 represents any suitable combination and arrangement of components supporting communications between radar scan converters 120 and COTS computers and displays 130. For example, digital network 140 may be an Ethernet within a local area network (LAN) or components in other suitable communications networks. For full fidelity, the digital signal is generated using a 20 MHz ADC with 12 bits. This is determined from the shortest pulse width of IMO radar antennas being between 50 and 100 nanoseconds. The PRF corresponding to the shortest pulse widths is usually around 3 kHz providing an unambiguous range of about 27 nautical miles or 6662 ADC samples (range bins) every 0.333 milliseconds.

In order to see speckle, the electronics are calibrated to use some of the lower ADC bits for receiver noise. For example, 3 bits may be used for the mean noise so that the 5 sigma noise level is around ADC level 48 (more than 5 bits). To prevent saturation by sea clutter, and loss of short range target detection, more than 8 bits in each ADC sample are needed. While 10 or 11 bits may suffice, the standard is 12 bits. If the 5 sigma noise level is attenuated below 4 bits, then the noise and long rang small targets will be undetectable.

Sending full fidelity signals over an Ethernet creates 12×20 Megabits per second (240 Mbps). While standard Gigabit Ethernet will handle this load easily, Ethernet is known not to perform well under loads greater than 50% of its specified capacity. Moreover, 20% of the load should be reserved for messaging protocol overhead. Thus the usable portion of a Gigabit Ethernet is 1000 Mbps−500 Mbps−100 Mbps=400 Mbps. Thus, full fidelity radar signals to a single display will fit into the bandwidth provided by a Gigabit Ethernet.

However, on a ship that has two or three antennas and up to 10 displays, the network usage for a single antenna/display system is multiplied by the number of antennas and the number of displays. Each display may need to combine signals from the antennas leading to a network bandwidth utilization for full fidelity of 3×10×240 Mbps=7.2 Gbps. This is greater than the useable bandwidth on a 10 Gigabit Ethernet. The network load at each display would be 3×(1.2×240 Mbps)=864 Mbps and beyond the capability of a normal Gigabit Ethernet. By performing the processing of data at the antenna as provided herein, the requirement for network bandwidth is greatly reduced.

Each COTS computer and display 130 may be able to access signals from a several radar scan converters 120. For example, COTS computer and display 130a may be able to access the signal from radar scan converter 120a for a certain period of time, and it may be able to access the signal from radar scan converter 120b for a certain other period of time. COTS computers and displays 130 may not need specialized electronics to process the signals received from the radar scan converters 120. Furthermore, COTS computers and displays 130 may be able to receive unprocessed radar video such that each COTS computer and display 130 can process the radar signal at any range scale, target sensitivity, and false alarm rate as desired. Each COTS computer and display 130 may only require software to render the radar video on display and to accept and transmit operator controls to the transceiver. In some embodiments, one COTS computer and display 130 may be the sole controller of the radar. In such an embodiment, one COTS computer and display 130 may be able to activate the radar and change pulse width modes. However, other COTS computers and displays 130 may still be able to process the data at any range scale desired.

Each COTS computer and display 130 is contemplated to support IMO standards for range and azimuth resolution. A sufficient number of pixels are needed in the PPI display area to support this standard. Typical super video graphics array (SVGA) graphics can support a PPI display area of 1024× 1024 pixels, which an satisfy the IMO standard. A range of video intensity colors or Shades of Green (SOG) also enhances the ability to resolve targets on the display. Common color schemes use 8 or 16 SOG (3 bits or 4 bits per pixel).

Figure 2:
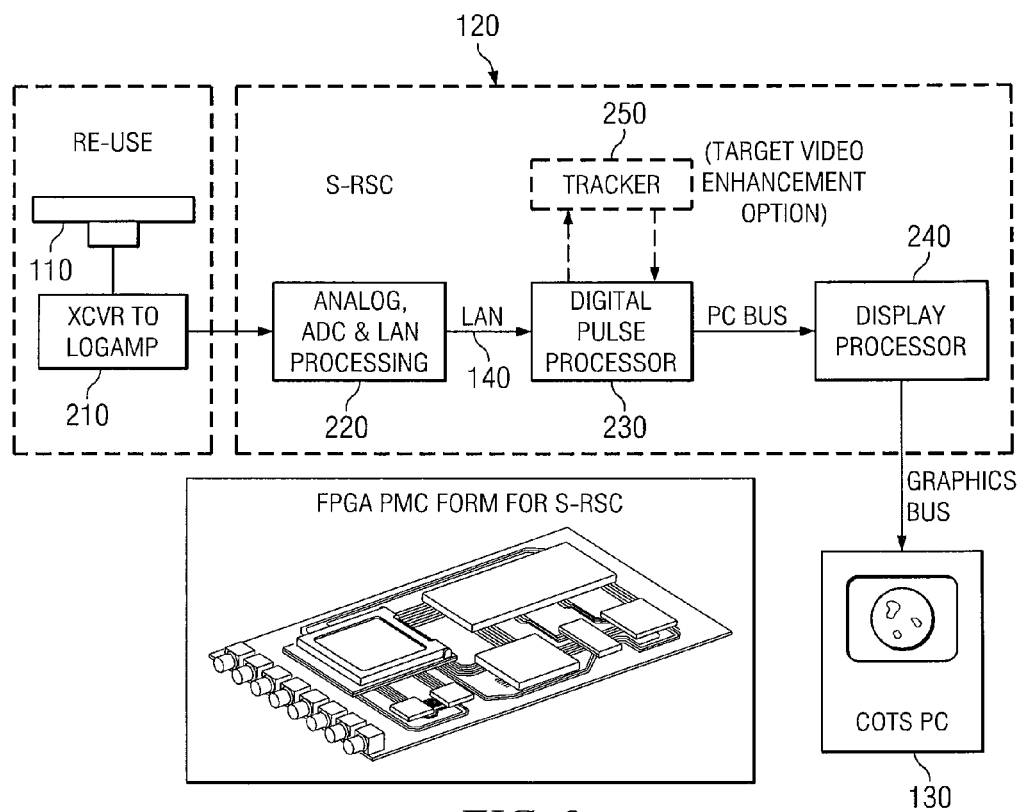
FIG. 2 illustrates a diagram showing an embodiment of a data flow and major processing blocks for a particular antenna 110 in a radar system 100 for full fidelity radar receiver digital video distribution and processing.

FIG. 2 illustrates a diagram showing an embodiment of a data flow and major processing blocks for a particular antenna 110 in a radar system 100 for full fidelity radar receiver digital video distribution and processing. Radar signals received by antenna 110 are processed by a transceiver 210 that provides analog signals to radar scan converter 120. Radar scan converter 120 includes an analog to LAN processor 220, a digital pulse processor 230, a display processor 240, and a tracker processor 250. Analog to LAN processor 220 performs analog to LAN processing and outputs digital signals onto digital network 140. Digital pulse processor 230 performs clutter reduction processing, combines data from multiple antennas, and formats the radar video into color codes. Display processor 240 provides the presentation capabilities for displaying radar data on COTS computer and display 130. In general, radar scan converter 120 provides the abstraction between antenna 110 and COTS computer and display 130. Abstraction is accomplished by having a modular analog pre-processor that adapts the transceiver 210 for antenna 110 to the digital pulse processor 220. A tracker processor 250 provides for tracking of detected targets.

Analog to LAN processor 220 is coupled to receive analog signals from transceiver 210 and formats radar transceiver information into digital streams of data for distribution to a variety of COTS computers and monitors. Each analog to LAN processor 220 outputs digitized signals after minimal processing. Analog to LAN processor 220 may use a modular circuit board to adapt the radar transceiver output for the digital processing needed to format the signal for coordinate conversion. Analog to LAN processor 220 outputs a continual stream of digital vectors associated with each digital azimuth.

In one embodiment, each analog to LAN processor 220 may be hosted on a digital board that hosts a Field Programmable Gate Array (FPGA). The FPGA may perform digital processing in very high speed integrated circuits (VHSIC) Hardware Description Language (VHDL). The inputs for each analog to LAN processor 220 may be maritime radar transceiver analog signals, such as video, trigger, and azimuth. Azimuth is a representation of the antenna position and indicates the direction of the radar pulse. Trigger indicates the time at which the radar pulse is fired, and the amplitude of the radar video represents a measure of the radar echo return signal. The output of each radar scan converter 120 is digital radar video.

Each analog to LAN processor 220 is contemplated to be a FPGA included in the pedestal of a Transmit/Receiver Up-Mast (TR-Up) radar of a corresponding antenna and may be installed with just two cables—one for power and one for the digital network 140. A control interface serial line for control signaling may also be used though such signaling may be incorporated into the digital network 140. Though shown as part of radar scan converter 120, the functions of Digital Pulse Processor 230 and Display Processor 240 are contemplated to be performed at COTS computer and display 130, but could also be implemented in a FPGA elsewhere within radar system 100.

Figure 3:
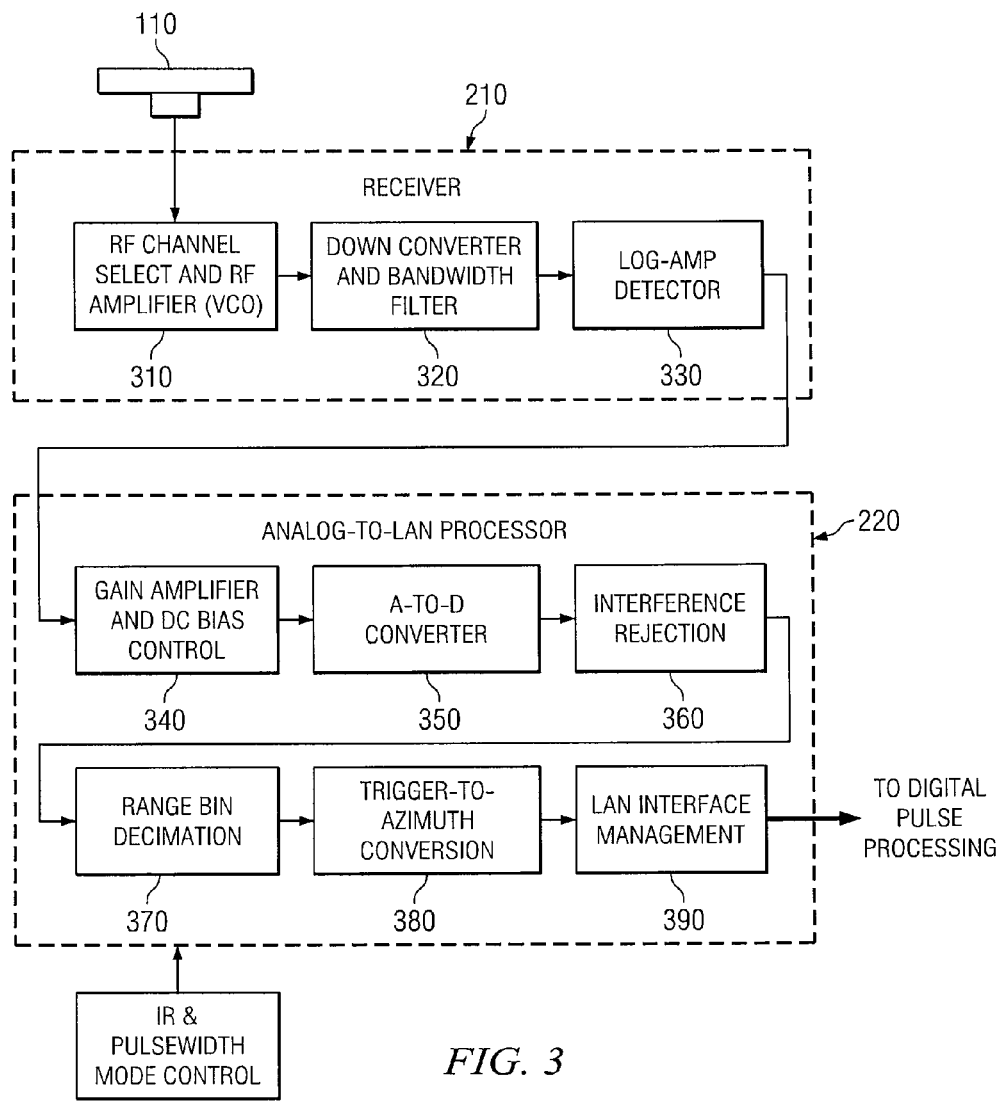
FIG. 3 shows an embodiment of a transceiver and analog to LAN processor that may format radar transceiver information into digital streams of data that can be processed by a COTS computer and display in the radar system.

FIG. 3 shows an embodiment of transceiver 210 and analog to LAN processor 220 that may format radar transceiver information into digital streams of data that can be processed by a COTS computer and display 130. Transceiver 210 includes a RF channel selector and RF amplifier 310, a down converter and bandwidth filter 320, and a log-amp detector 330. Analog to LAN processor 220 may include a gain amplifier and DC bias controller 340, an analog-to-digital converter (ADC) 350, an interference rejector 360, a range bin decimator 370, a trigger-to-azimuth converter 380, and a LAN interface manager 390.

From each pulse emitted by the transceiver 210 at antenna 110, transceiver 210 receives echoes that are converted to a radar video signal. The radar video signal is a rapidly fluctuating voltage whose larger voltage peaks represent targets or clutter of some form. Each pulse of the transceiver 210 is associated with a direction by the antenna's azimuth (or bearing) measurement devices. The rate of pulses, or pulse repetition intervals (PRI triggers) is asynchronous with antenna motion, resulting in an arbitrary relationship between a number of PRI triggers per azimuth step by the antenna. Antenna direction may be measured in binary coded angles using 12 bits so that each azimuth step in the code for a 4096 step antenna is 360/4096=0.087890625. The pulse repetition frequency (PRF) may vary from 3 KHz to 750 Hz for long range surveillance.

Inputs provided to analog to LAN processor 220 from transceiver 210 may include composite trigger, antenna azimuth, and log-amp signals. A set of start/stop azimuths in which sector blanking is set may be included as well. Control, gain, and bias signals may also by provided. Analog to LAN processor 220 will generate a PRI estimate upon receiving triggers. Upon receiving azimuth data, analog to LAN processor 220 will estimate the antenna turn rate. Processing decisions will be made based on these measured parameters. If these parameters are under operator control, messages can be generated based on significant differences between measured and commanded values.

Gain amplifier and bias controller 340 may prepare the radar transceiver signals to fit within the range of the ADC 350. The gain and bias settings may depend on the mode of the radar transceiver 210 or the settings may be constant for a particular radar transceiver 210 yet be variable depending on the type of radar transceiver. In some embodiments, signals are prepared to fit within a 12-bit ADC 350 running at 40 MHz. Gain and bias control prior to analog to digital conversion is important to small target detection. Gain and bias set so low that receiver noise fluctuations can be seen in an ADC output will miss detection of small targets. In order to provide small target detection, gain and bias should be set so that the minimum noise level is output at approximately ADC level 8.

ADC 350 receives the analog signals from gain amplifier and bias control 340 and converts the analog signals to digital signals. With each trigger at the antenna, the ADC may be given a fresh buffer in which to output as many as 64,000 samples. The output to the subsequent functions of the radar scan converter is an azimuth list indexed by range bins. With each rotation of the antenna, ADC 350 may produce a 2-dimensional array of 12-bit integers indexed by range and azimuth. In some embodiments, ADC 350 may operate at 40 MHz, which may allow for full fidelity radar signals to a single COTS computer and display to fit into the bandwidth provided by a standard gigabit Ethernet. An example output generated by ADC 350 may be 12-bit unsigned integers from A-to-D samples of the video operating at 40 MHz that result in an initial range bin size of 3.75 meters. The choice of a 40 MHz ADC rate minimizes trigger jitter errors in establishing the zero range. If the PRF is above 3500 Hz, the first 8000 range bins will be processed at this resolution to a maximum range of 8000×3.75/1852=16 nautical miles, possibly clipped to a percentage of the unambiguous range to provide overhead for processing. If the PRF is below 3500 Hz, a minimum-of-2 data down-sampling is performed prior to interference rejection using a minimum of adjacent pairs of range bins.

Signals are then passed to interference rejector 360. Interference rejector 360 filters unwanted signals, such as those from another radar antenna. As the time between the pulses of a radar antenna may vary, large pulses from another radar antenna may show up as large outliers in the digital bins of the ADC 350. Interference rejection 360 filters the signals on a pulse-by-pulse basis. Three prior PRIs of digital range bins are buffered to process with the currently arriving PRI. A selectable threshold is used to determine if a middle return is an outlier. If the threshold is exceeded, the outlier return is replaced by a median of its neighbors. If the threshold is not exceeded, no replacement is performed.

Range bin decimator 370 receives the signals from interference rejection 360 and reduces the amount of data to be processed. Range bin decimator 370 may be used to limit the data processed to 8,000 range bins per azimuth. Radars have multiple pulse width modes at which they send out pulses of wave signals, and the range extent of each range bin is a function of the pulse width mode in use. If a long pulse width mode is in use, the range bin decimator 370 may collapse a group of range bins into one large range bin such that only 8,000 range bins per azimuth are processed. If the PRF is less than 1600 Hz, another down-sampling is performed using a maximum of adjacent pairs of range bins. If the PRF is less than 800 Hz, another data down-sampling is performed using a maximum of adjacent pairs of range bins. Since range bin sizes started at 3.75 meters, there is the possibility of producing as many as 8000 range bins of sizes 3.75, 7.5, 15, 30, and 60 meters corresponding to maximum ranges of 16, 32, 64, 128, or 256 nautical miles. The actual number of range bins is a percentage of the measured unambiguous range and will be shorted than these values.

The trigger-to-azimuth converter 380 receives the signals from range bin decimator 370 and reconfigures the return pulse data into azimuth bins due to the fact that there is not necessarily a relationship between antenna pulse triggers and the antenna azimuth steps. As there may be 10,000 pulses sent out per antenna rotation, yet never more than 4,096 steps in an antenna rotation, the radar may produce redundant data at high pulse range frequencies. On the other hand, at low pulse range frequencies, multiple azimuth steps may occur between triggers. Thus, the trigger-to-azimuth converter 380 may be used to replicate data for radar antennas operating at low pulse range frequencies and perform data reduction for radar antennas operating at high pulse range frequencies. Added complications come from blanking sectors where the antenna still rotates but pulse triggers may not be generated by transceiver 210. During a blanking sector, the output range/azimuth buffer is filled even when no triggers are received. Zero value amplitudes are placed into the buffer during a blanking sector. Whenever an azimuth change is detected (a PRI of range bins has arrived marked by a new azimuth), the prior azimuth of data is propagated to the next processing stage, associated with the prior azimuth, and the current PRI of range bins is stored for the new azimuth. If the change in azimuth is m times the selected azimuth increment, the old data is written out m times artificially incremented by one azimuth step associated with each copy of the output. If a subsequent PRI trigger is associated with a same azimuth as stored data of a previous PRI trigger, then an averaging is performed. This approach emphasizes the last PRI trigger received, but does not have to anticipate how many PRI triggers at any given azimuth will be received.

LAN interface manager 390 receives the signals from trigger-to-azimuth converter 380 and processes the signals for transmittal to the digital network 140. Efficient packaging is performed to minimize protocol overhead and message interruption of at the COTs computers and displays 130. After processing by analog to LAN processor 220, the worst case output bandwidth onto digital network 140 for a 24 RPM antenna rotation is 12 bits×4096 azimuths×8000 bins/2.5=158 Mbps without compression. At higher rotation rates, less azimuths per scan can be used. If desired, compression can be implemented as long as data decompression at the COTS computer and display 130 is made efficient. To handle network interruptions and changes in the master computer, radar data may be multi-cast using UDP/IP protocols in order to avoid knowing how many clients are accessing the data on the digital network 140.

The following are example outputs produced by analog to LAN processor 220 and placed on digital network 140. Radar Relative Azimuth is a 12-bit word ranging in value from 0 to 4096 indicating the antenna position relative to the Bearing Change Pulse or Heading Flash or Ship's Bow. Range Samples are 12-bit unsigned integers indicating an array of ADC samples of radar video from each azimuth step. Status is a descriptor indicating valid data and a heartbeat. Range Bin Size is an unsigned integer with value between 3.75 and 60 meters indicating a range step per ADC sample. N is an unsigned integer ranging from 100 to 8000 indicating a number of range bins per PRI. Azimuth mode is a 2-bit descriptor indicating 12-bit, 11-bit, or 10-bit azimuths. Average PRI is an unsigned integer ranging in value from 20 to 200 indicating a low pass filtered time between triggers. AZ Rate is an 8-bit unsigned integer indicating a low pass filtered time between azimuth steps.

Figure 4:
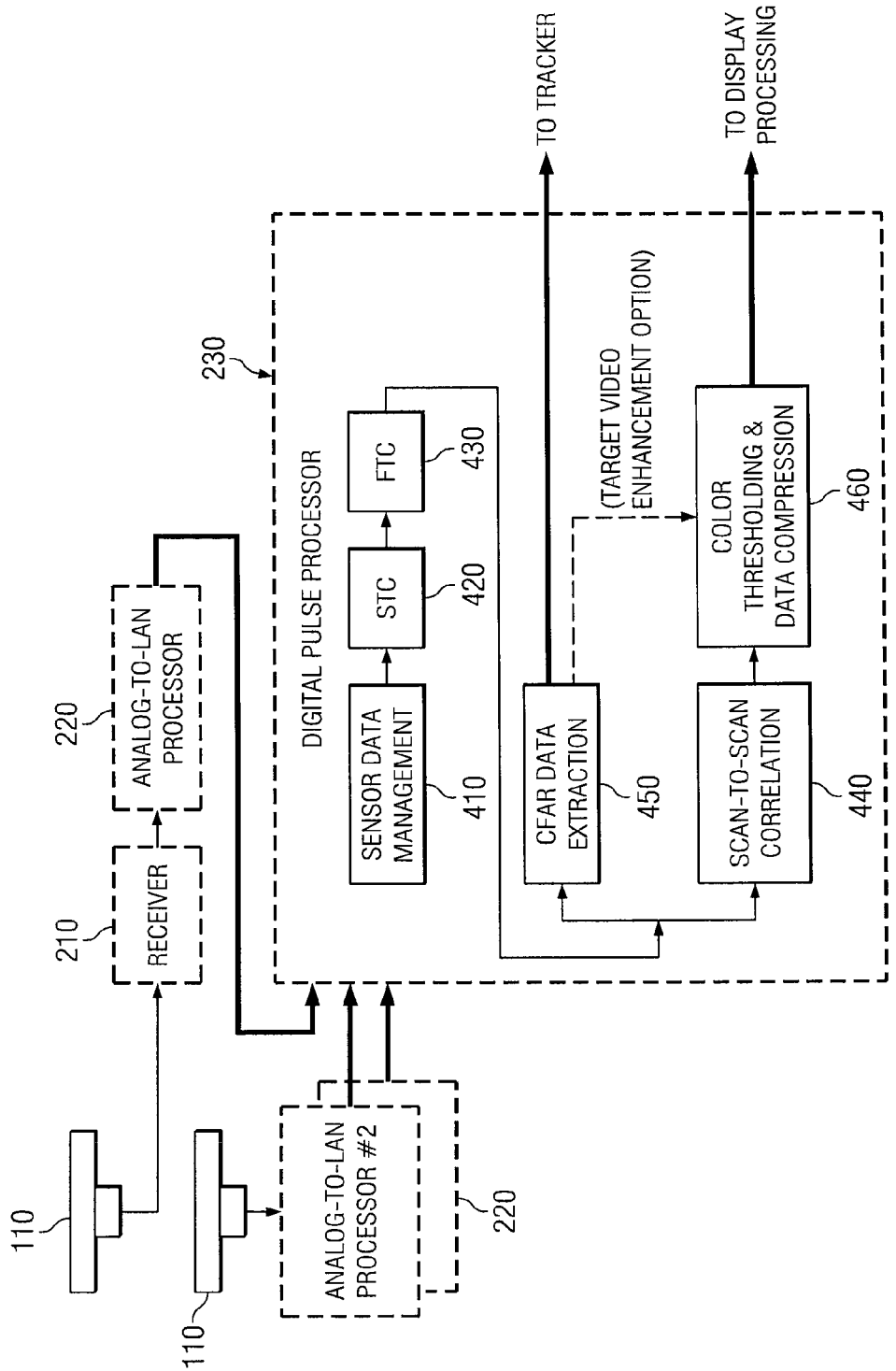
FIG. 4 shows an embodiment of a digital pulse processor that may format radar transceiver information that can be processed by a COTS computer and display in the radar system.

FIG. 4 shows an embodiment of digital pulse processor 230 that may format radar transceiver information that can be processed by a COTS computer and display 130. Digital pulse processor 230 performs clutter reduction processing such as Sensitivity Time Control (STC), combines video from multiple antennas, and formats the radar data into color codes. Digital pulse processor 230 includes a sensor data manager 410, a sensitivity time controller 420, a fast time constant (FTC) processor 430, a scan-to-scan correlator 440, a constant false alarm rate (CFAR) data extractor 450, and a color threshold and data compressor 460.

Sensor data manager 410 receives the outputs generated form each analog to LAN processor 220. Other inputs received by sensor data manager 410 include ship speed and heading, pulse width mode, and STC and FTC control. Allowances in processing may be made for lost UDP/IP packets. Lost azimuth packets can be filled in using trigger to azimuth conversion performed in analog to LAN processor 220. When analog to LAN processor 220 provides an indication that the data is not valid, digital pulse processor 230 can continue to process the data but will provide a warning to the display processor 240 that the data is not proper for normal operation. Sensor data manager 410 also combines data from multiple antennas by writing azimuth data from an appropriate antenna into the appropriate locations of a polar data buffer. For antennas that are not right on top of each other, sensor data manager 410 performs range/azimuth adjustments such that the data in the polar data buffer is consistent to a common reference. Different priorities can be assigned to different antennas in determining what data is placed into the polar data buffer. Data from a second antenna may be used by sensor data manager 510 to overwrite data from a first antenna if the second antenna has the latest update from a particular sector. Sensor data manager 510 can also provide azimuth encoding, range bin size/number, amplitude encoding, and clutter filtering adjustments when antennas are considerably different in their data formats.

Sensitivity time controller 420 performs STC processing based on operator control indicating sea state, a clutter model associated with the sea state, and attenuator hardware. The data can be analyzed to provide automatic STC adjustments while the display is provided with clutter filtered images. The problem with automatic STC adjustment is in the detection of rain or land clutter that corrupts the estimated sea clutter profile. Large deviations from a best fit can alert an operator to resort back to manual STC. Two types of STC that can be performed include multiplicative STC and subtractive STC. Multiplicative STC reduces near range clutter fluctuations while also reducing mean clutter level. Subtractive STC eliminates mean clutter bias but does not reduce clutter fluctuations. However, in the digital domain, subtractive STC is less processor intensive.

FTC processor 430 performs a subtraction of a sliding window mean signal estimator. The sampling index need not increment by 1 range bin at a time in order to get independent samples in the estimator but requires knowledge of the ratio of the transmitted pulse width to the range bin size to do so. Signal samples for FTC processing can be started in front of the range bin being modified. At some range, it will be desirable to switch around so that the front of rising coastlines is not suppressed by FTC. By performing FTC processing after STC processing, incorrect settings in STC processing can be compensated. FTC processing is performed before scan-to-scan correlation as non-linear effects in scan-to-scan correlation may make FTC processing less effective in bringing targets out of residual clutter originally left so high as to correlate over many scans.

After STC and FTC processing, scan-to-scan correlation is the most significant contributor to sea clutter reduction. In conventional radar systems, scan-to-scan correlation occurs after coordinate conversion. Here, a scan-to-scan correlator 440 is positioned before coordinate conversion (in display processor 240) when the data is in a polar format. As a result, ship motion must be accounted for as the signals are not yet stabilized. Ship motion is based on constant velocity which makes for linear processing in Cartesian coordinates but non-linear processing in polar coordinates. By performing scan-to-scan correlation in polar coordinates, smearing of the image in ship turns can be prevented. Increasing the number of heading updates per scan will assist in eliminating smearing during fast ship turns. Adjustments needed to combine polar-formatted data from separated locations can be calculated exactly and can also be approximated by simple formulas. To save processing time, scan-to-scan correlation is not performed beyond the horizon of the antenna. In particular, scan-to-scan correlation is not performed beyond the smaller of the range to the physical horizon and the range at which sea clutter return falls below the noise level A threshold can be set so that very high new video returns are not diminished by the correlation process.

Color thresholding and data compressor 450 provides a transfer function from ADC levels to color levels. Color thresholding determines the Shade of Green to be used on the display. A look-up table is used for converting ADC levels to pixel colors and a simple table look up is performed for each range bin at every azimuth. The look-up table is established by dropping bits from the bottom of the signal representing mean noise and determining the minimum non-black color form the operator's gain setting (thought of as greater than mean noise). The operator gain setting determines the minimum ADC level to get a non-black color. The operator gain setting is then mapped linearly between minimum and maximum values.

CFAR data extractor 450 performs data extraction for the Tracker before any loss of signal fidelity due to signal thresholding for color. Data extraction results in, for each azimuth, a list of pairs of 16-bit integers for each contiguous detection. Each pair represents the range bin index of the start of a contact's threshold crossing and the number of contiguous range bins above the threshold. The maximum number of such pairs per azimuth can be configured to preserve processing power. A constant false alarm rate technique for threshold generation can be used in CFAR data extractor 450. Input of graphical zones is permitted in which the threshold can be arbitrarily modified higher or lower. A slight rise in the data extraction threshold is justified near the range where mean sea clutter becomes lower than noise because sea clutter fluctuations are spikier than noise fluctuations. CFAR data extractor 450 provides the pairs of numbers to tracker processor 250.

Tracker processor 250 processes the number pairs in groupings of consecutive azimuths and overlapping ranges of detections that allow some false alarm reductions when the processed groupings are too small or too large. Centroiding is performed on the number pairs and the centroids are converted to tracker coordinates and correlated to a track filter update. Real targets will correlate over 10 azimuths or more. For example, 100 detections per azimuth leads to as many as 100 contacts per beam or 36,000 centroids to process per scan. To control the amount of data for correlation and preserve detection processing power, the maximum tracking range for collision avoidance and minimum tracker range for coastal surveillance are restricted. Such control can be accomplished by setting the minimum/maximum range bin index for processing or by artificially raising the threshold to the maximum allowed value over the ranges of no interest.

Digital pulse processor 230 outputs a status word indicating a data valid status and the azimuth reference of the output, an azimuth step code indicates whether azimuth processing is 12-bits, 11-bits, or 10-bits, a range bin size indicates a range size between 3.5 and 60 meters per sample, a two-dimensional array of colors indexed by range bin and true/relative azimuth, and data extraction pairs indicating range start and run length of video exceeding CFAR thresholds. Other than the extraction pairs, these outputs are provided to display processor 240.

Figure 5:
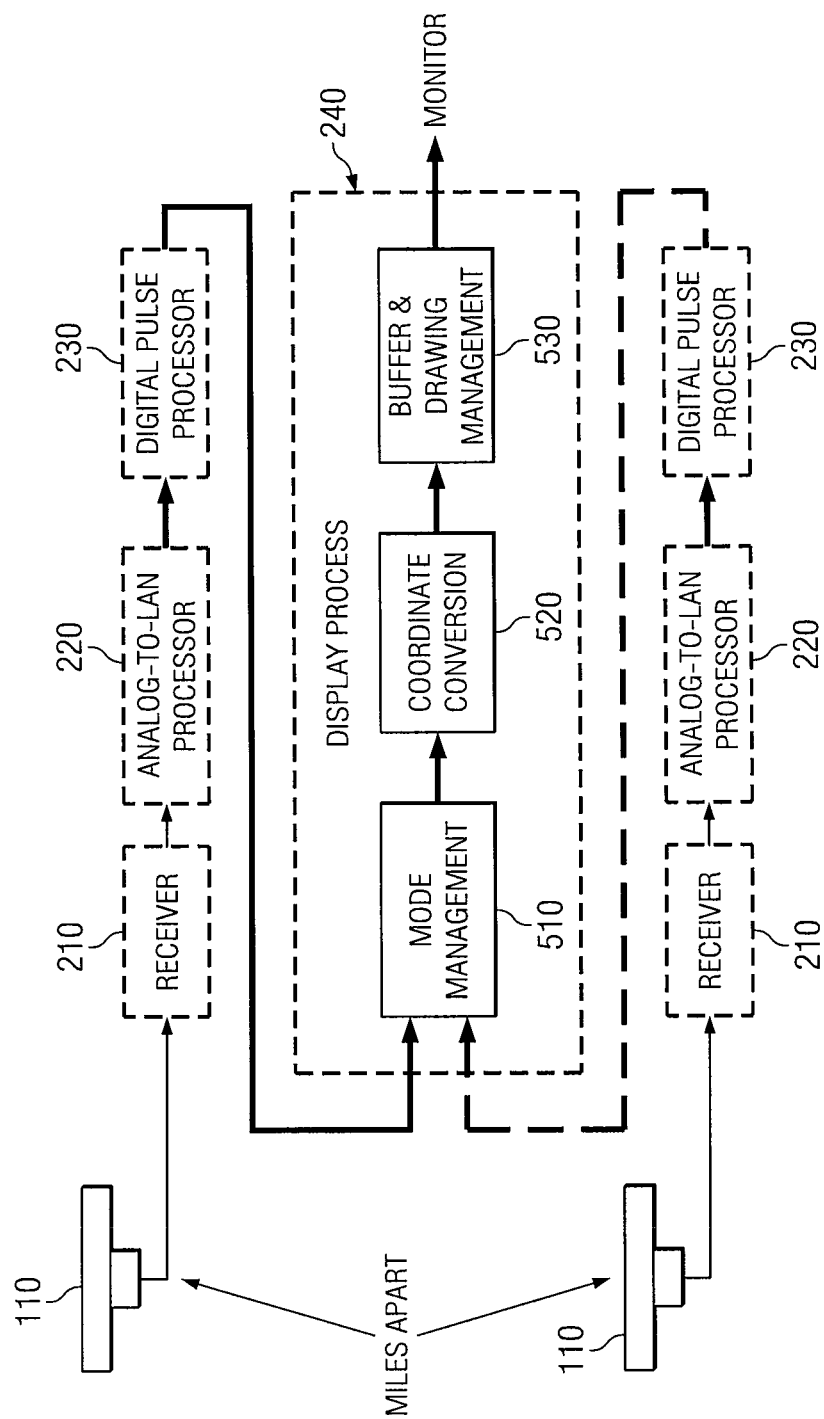
FIG. 5 shows an embodiment of a display processor that presents processed radar transceiver information at a COTS computer and display in the radar system.

FIG. 5 shows an embodiment of display processor 240 that presents processed radar transceiver information at a COTS computer and display 130. Display processor 240 accounts for presentation capabilities such as offset PPI, true/relative motion, persistence or afterglow, and combination of video from antennas installed far apart. Fixed offset in the PPI can be accomplished in coordinate conversion by specifying a PPI center point other than the pixel corresponding to the monitor center point, assuming that the number of pixels in coordinate conversion is sufficient to extend the PPI farther in one direction than in its reciprocal direction. A large PPI offset is a useful capability for judging the alignment of the radar installation. Persistence is achieved by selecting a color scheme for each time of day for the afterglow. Each PPI update causes a low pass filter to operate on the color. The time constant of the low pass filter determines the amount of time the afterglow persists on the display. Time constraints up to infinity are useful so that a bright return stays on the PPI until manual control resets the whole display. Virtually undetectable targets can be observed on the PPI with infinite persistence by a tell-tale wake in the clutter. Fast moving targets can leave a straight line wake on the display even though they move too fast for tracker correlation.

Display processor 240 includes a mode manager 510, a coordinate converter 520, and a buffer and drawing manager 530. Display processor 240 receives inputs provided by digital pulse processor 230 as well as a display range scale indicating a distance represented by a pixel and a display mode indicating orientations such as north-up, head-up, course-up, persistence, and color scheme.

Mode manager 510 knows the display mode settings for each antenna input from any number of digital pulse processors 230. From the known latitude and longitude of each antenna at the time of image processing, mode manager 510 determines the pixel location of multiple antennas' imagery relative to either the corresponding Electronic Chart Display and Information System (ECDIS) or the common reference point of the display relative to the ship's central reference point (CRP). Mode manager 510 processes offsets of antenna inputs from ship reference points. Mode manager 510 determines pixel offsets from ship speed and course based on a time difference since the last monitor update. Mode manager 510 can convert the range bin color amplitudes into primary scan colors and persistence or afterglow colors. Mode manager 510 provides antenna masks to combine multiple images from a number of antennas into a single image with desired priority for display.

Coordinate converter 520 processes two types of azimuths—relative if scan-to-scan correlation is not performed and true if can-to-scan correlation is performed. Adjustments are made for the stabilization mode requested by the display. Coordinate converter 520 converts natural radar coordinates of range and azimuth (i.e. polar coordinates) into Cartesian coordinates of the display pixels. Coordinate converter 520 takes the two-dimensional array of colors indexed by range bin and azimuth and assigns each color to a corresponding pixel row and column. Coordinate converter 520 generates a time-tagged array of pixel intensities with a status that indicates the range scale, orientation, and geodetic coordinates of the PPI center associated with antenna position. This array is indexed in relative pixel coordinates so that location on the display will depend on the addition of the pixel coordinates of some reference point such as center or upper left-hand corner.

The buffer and drawer manager 530 is responsible for painting the PPI on the display monitor. Buffer and drawer manager 530 generates the impression of a smooth PPI sweep rotation on the display for a single antenna system at the rate of antenna rotation. Buffer and drawer manager 530 provides the persistence or afterglow for the display using a low pass filter acting on the pixel coordinates of the images as well as by adjusting color selection for the trail to provide a contrast from the last scan. For combining data from antennas that are geographically separated by many miles, buffer and drawer manager 530 uses a pixel mask to determine which antenna's data will write on each pixel.

Any suitable logic comprising software, hardware, other logic, or any suitable combination of the preceding may perform the functions of radar system 100 and the elements within radar system 100. The logic may be embodied on a circuit board or on a computer readable medium and may operate on one or more computers. Moreover, though specific numbers and parameters are provided, such specificity is purely for example purposes as those skilled in the art would readily recognize that other values could be used in the implementation of radar system 100.

Although the present disclosure and its advantages have been described in detail, it should be understood that various changes, substitutions, and alterations readily ascertainable by those skilled in the art can be made therein without departing from the scope of the disclosure as defined by the appended claims.

What is claimed is:

1. A processing device for providing radar data onto a local area network, comprising:
   an analog-to-digital converter operable to receive analog radar data from an antenna in response to a generated pulse, the analog-to-digital converter operable to convert the analog radar data into digital radar data;
   an interference rejector operable to remove radar signals of other antennas from the digital radar data;
   a range bin decimator operable to limit the digital radar data to a threshold number of range bins;
   a trigger-to-azimuth converter operable to associate the digital radar data to particular azimuths of rotation of the antenna; and
   a local area network manager operable to receive processed digital radar data from the trigger-to-azimuth-converter and to place the processed digital radar data onto a local area network;
   wherein the processing device is provided to be positioned in a pedestal of the antenna; and the trigger-to-azimuth converter is operable to detect a change in azimuth of the antenna wherein, whenever a change in azimuth is detected, prior azimuth data is propagated to a next processing stage, and a current pulse repetition interval of range bins is stored for the new azimuth, and, if the change in azimuth is m times a selected azimuth increment, the prior azimuth data is written out m times artificially incremented by one azimuth step associated with each copy of the output, and, if a subsequent pulse repetition interval trigger is associated with a same azimuth as stored data of a previous pulse repetition interval trigger, an averaging of the digital radar data for each pulse associated with a particular azimuth is performed.

2. The processing device of claim 1, further comprising:
   a gain amplifier and bias controller operable to set a gain and bias to allow for noise fluctuations to be seen in the digital radar data for small target detections.

3. The processing device of claim 1, wherein the range bin decimator is operable to perform down-sampling to further reduce a number of range bins.

4. The processing device of claim 3, wherein down-sampling is performed based on how frequent pulses are transmitted from the antenna.

5. The processing device of claim 3, wherein down-sampling is performed multiple times depending on how frequent pulses are transmitted from the antenna.

6. The processing device of claim 1, wherein the local area network manager provides the digital radar data on the local area network as a two dimensional array of values in polar coordinates indexed by range and azimuth.

7. A system for providing radar data onto a local area network, comprising:
   a plurality of antennas, each antenna including the processing device of claim 1;
   a plurality of computer and display units operable to process and display digital radar data generated by the processing devices; and
   a local area network coupling the processing devices and the computer and display units.

8. The system of claim 7, wherein each computer and display unit performs sensitivity time control, fast time constant, scan-to-scan correlation, and color threshold processing on selected digital radar data generated by the plurality of processing devices.

9. The system of claim 7, wherein each computer and display unit performs coordinate conversion and drawing management to present a radar image of the digital radar data.

10. A method for providing radar data onto a local area network, comprising:
    receiving analog radar data from an antenna;
    converting the analog radar data into digital radar data;
    removing radar signals of other antennas from the digital radar data;
    limiting the digital radar data to a threshold number of range bins;
    associating the digital radar data to particular azimuths of rotation of the antenna; and
    placing the digital radar data onto a local area network;
    wherein the method is carried out in a pedestal of the antenna; and
    the step of associating the digital radar data to particular azimuths of rotation of the antenna comprises a step detecting a change in azimuth of the antenna wherein, whenever a change in azimuth is detected, prior azimuth data is propagated to a next processing stage, and a current pulse repetition interval of range bins is stored for the new azimuth, and, if the change in azimuth is m times a selected azimuth increment, the prior azimuth data is written out m times artificially incremented by one azimuth step associated with each copy of the output, and, if a subsequent pulse repetition interval trigger is associated with a same azimuth as stored data of a previous pulse repetition interval trigger, an averaging of the digital radar data for each pulse associated with a particular azimuth is performed.

11. The method of claim 10, further comprising:
    setting a gain and bias to allow for noise fluctuations to be seen in the digital radar data for small target detections.

12. The method of claim 10, further comprising:
    performing down-sampling to further reduce a number of range bins.

13. The method of claims 10, wherein the digital radar data is provided on the local area network as a two dimensional array of values in polar coordinates indexed by range and azimuth.

14. A system for radar video distribution comprising:
    one or more displays;
    one or more antennas, each of which is operable to produce analog radar data;
    one or more processing devices, each of which is operable to receive the analog radar data from a separate antenna, wherein each processing device comprises an analog-to-digital converter operable to receive analog radar data from an antenna in response to a generated pulse, the analog-to-digital converter operable to convert the analog radar data into digital radar data, an interference rejector operable to remove radar signals of other antennas from the digital radar data, a range bin decimator operable to limit the digital radar data to a threshold number of range bins, and a trigger-to-azimuth converter operable to associate the digital radar data to particular azimuths of rotation of the antenna, and a local area network manager operable to receive processed digital radar data from the trigger-to-azimuth converter; and a local area network coupled between the processing device and the at least one display, wherein the network is operable to receive the processed digital radar data from the local area network manager and to transmit the processed digital radar data to the at least one display;

wherein the processing device is positioned in a pedestal of the antenna; and the trigger-to-azimuth converter is operable to detect a change in azimuth of the antenna wherein, whenever a change in azimuth is detected, prior azimuth data is propagated to a next processing stage, and a current pulse repetition interval of range bins is stored for the new azimuth, and, if the change in azimuth is m times a selected azimuth increment, the prior azimuth data is written out m times artificially incremented by one azimuth step associated with each copy of the output, and, if a subsequent pulse repetition interval trigger is associated with a same azimuth as stored data of a previous pulse repetition interval trigger, an averaging of the digital radar data for each pulse associated with a particular azimuth is performed.

15. The system of claim 14, wherein each display is operable to receive digital signals from any of the one or more processing devices.

* * * * *